(12) United States Patent
Sheu

(10) Patent No.: US 7,099,301 B1
(45) Date of Patent: Aug. 29, 2006

(54) VOICE OVER INTERNET PROTOCOL PROXY GATEWAY

(75) Inventor: Hueymin Sheu, Fremont, CA (US)

(73) Assignee: InnoMedia, Inc., San Jose, CA (US)

( * ) Notice: Subject to any disclaimer, the term of this patent is extended or adjusted under 35 U.S.C. 154(b) by 0 days.

(21) Appl. No.: 09/352,280

(22) Filed: Jul. 13, 1999

(51) Int. Cl.
*H04L 12/66* (2006.01)

(52) U.S. Cl. .................. 370/352; 370/401; 379/218.01

(58) Field of Classification Search ................ 370/352, 370/355, 354, 356, 401, 353; 455/408
See application file for complete search history.

(56) References Cited

U.S. PATENT DOCUMENTS

| | | | | |
|---|---|---|---|---|
| 4,162,377 A | * | 7/1979 | Mearns | 179/18 |
| 5,390,242 A | * | 2/1995 | Bales | 379/221 |
| 5,854,975 A | * | 12/1998 | Fougnies | 455/408 |
| 6,134,235 A | * | 10/2000 | Goldman | 370/352 |
| 6,421,339 B1 | * | 7/2002 | Thomas | 370/352 |
| 6,445,694 B1 | * | 9/2002 | Swartz | 370/352 |
| 6,445,695 B1 | * | 9/2002 | Christie, IV | 370/352 |
| 6,470,020 B1 | * | 10/2002 | Barker et al. | 370/401 |
| 6,473,499 B1 | * | 10/2002 | Ng et al. | 379/121.02 |
| 6,539,077 B1 | * | 3/2003 | Ranalli et al. | 379/67.1 |

FOREIGN PATENT DOCUMENTS

| | | | |
|---|---|---|---|
| EP | 0843454 A2 | * | 11/1997 |
| EP | 0866596 A2 | * | 3/1998 |
| WO | WO01/05115 A2 | * | 1/2001 |

OTHER PUBLICATIONS

Hanson et al., "Phone Doubler-A step towards integrated Internet and telephone communities" Ericsson Review No.: 4 1997, pp. 142-151.*

Revised by ITU-T Study Group 16, "ITU-T Recommendation H.323 Series H: Audiovisual Services—Systems and Terminal Equipment for Audiovisual Services," (Feb. 1998), Table of Contents, Chapters 6, 7 & 8; Annex A, B and C; and Appendix I, II and III, 195 pages.

Web Page, "Free On Line Dictionary of Computing (FOLDOC)", http://wombat.doc.ic.ac.uk/foldoc/index.html, Dictionary Entries: coder/decoder, Pulse Code Modulation Computer Telephone Integration, Mar. 4, 1999, 3 pages.

Web Page, "Voice Over IP", http://www.itk.de/voip/glossar.html, Glossary, Mar. 4, 1999, 2 pages.

(Continued)

*Primary Examiner*—Doris H. To
*Assistant Examiner*—Robert W. Wilson
(74) *Attorney, Agent, or Firm*—Bingham McCutchen LLP

(57) ABSTRACT

A proxy gateway for voice over Internet protocol telephony. The proxy gateway includes a terminal portion and a gateway portion. The gateway portion is coexisting and in communications with the terminal portion. The proxy gateway is capable of interfacing with a gatekeeper and a gateway. The proxy gateway is further capable of interfacing with at least one terminal via a network to which the at least one terminal is attached. The proxy gateway uses its terminal portion for interfacing with the at least one terminal. The proxy gateway uses its gateway portion for interfacing with the gateway and gatekeeper. Another aspect of the invention is a telephony system in which at least one proxy gateway is deployed. The proxy gateway has dual characteristics such that it behaves as a terminal with respect to other terminals and as a gateway with respect to other gateways.

17 Claims, 10 Drawing Sheets

OTHER PUBLICATIONS

Web Page, "H.323 Implementation Notes", http//www.computek.net/public/plong/h323impl.html, Mar. 4, 1999, 3 pages.

Web Page, "DataBeam H.323 Developer's Toolkit", http://www.databeam.com/h323/index.html, Mar. 3, 1999, 1 page.

Web Page, "H.323 Version 2—Overview", http://www.databeam.com/h323/whatsnew_v2.htl, Mar. 4, 1999, 6 pages.

Web Page, "A Primer on the H.323 Series Standard—Version 2.0", http://www.databeam.com/h323/h323primer.html, Mar. 4, 1999, 18 pages.

Web Page, "DataBeam H.323 Toolkit Series, Version 2.0", http://www.databeam.com/h323/info.html, Mar. 4, 1999, 5 pages.

Web Page, "Dialogic—Computer Telephony Standards", http://www.dfialogic.com/company/aboutct/ctstand.htm, Mar. 4, 1999, 6 pages, including cover page.

Web Page, "VocalTec Telephony Gateway", http://www.alliancesystems.com/vocaltecprod.htm, Mar. 4, 1999, 7 pages.

Web Page, "DM3™ IPLink: Next-Generation IP Telephony", http://www.alliancesystems.com/ipteldm3oview.htm, Mar. 4, 1999, 4 pages.

Web Page, "IP Telephony—Applications for IP Telephony", http://www.alliancesystems.com/iptelephonyapps.htm, Mar. 4, 1999, 5 pages.

Web Page, "IP Telephony—IP Telephony Basics", http://www.alliancesystems.com/iptelephonybasics.htm, Mar. 4, 1999, 7 pages.

Web Page, "Dialogic—DM3 IPLink Release 2 High-Density Standards-Based IP Telephony Platforms", http://www.dialogic.com/products/d_sheets/3940web.htm, Mar. 4, 1999, 5 pages.

Web Page, "Dialogic—Dialogic White Papers", http://www.dialogic.com/company/whitepap/index.htm, Mar. 4, 1999, 14 pages.

* cited by examiner

VOICE OVER INTERNET PROTOCOL PROXY GATEWAY

FIELD OF THE INVENTION

This application relates to network communications and, specifically, to voice over Internet protocol telephony.

BACKGROUND OF THE INVENTION

Computer interconnection and communications systems are generally referred to as networks. Networks are typically classified according to their geographical extent as local area networks (LANs), metropolitan area networks (MANs) and wide area networks (WANs). The Internet is a global network of computer networks. Computers attached to the Internet can communicate by sending messages to each other via the Internet.

Telephone networks such as the public switched telephone network (PSTN) have been dominating voice communications. Computer networking has grown side-by-side with telephone networks. The consolidation of voice and data communication on the Internet around an Internet protocol (IP) now allows sound enabled computers to exchange digitized audio messages via the Internet.

IP telephony uses the Internet for real-time audio communications where two or more participants can carry a conversation. The IP telephony is governed by the data network communications standard, known as the Internet protocol, that allows voice to ride on the data network.

Since IP telephony is capable of combining voice and data on a single line, IP telephony is advantages in instances where a single phone connection is used for on-line access. Additionally, through deployment of IP telephony international and long-distance telephone service providers can offer Internet phone calls to customers with software for multimedia PCs (personal computer).

Gateways are key components in every IP telephony infrastructure. FIG. 1 illustrates an exemplary IP telephony infrastructure. Gateways 130 offer the advantage of IP telephony by bridging between the traditional telephone network 120 and the Internet 110. For real-time communications through the Internet 110, gateways 130 provide audio conversion and perform call setup and termination.

Telephone-to-telephone 160 communications require two gateways 130. This configuration can be advantageously used for low-cost long distance and international calls. For example, a telephone call can be placed via the telephone network 120a in one country, and through a gateway 130a in this country the telephone call can be routed to a gateway 130b in a second country via the Internet 110. The second gateway 130b connects the call to the destination telephone 160b via the telephone network 120b in the second country. The routing through the Internet allows bypassing of the international connection fees.

In addition to gateways 130, an important component in IP telephony infrastructure is a gatekeeper 140. A gatekeeper acts as a central point for all calls within its zone and provides call control services to registered terminals 150 and gateways 130 including balancing among multiple gateways 130. Routing of calls through gatekeepers 140 allows service providers to bill for calls placed through their network. Gatekeepers 140 also perform address translations to IP addresses and manage the communications bandwidth.

An umbrella protocol the governs IP telephony and provides the standard for audio, video, and data communications across IP-based networks, including the Internet, is known as the H.323 standard. Conformance with the H.323 standard intends to provide for transparent communications between gateways and terminals or single user devices (hereafter collectively referred to as "terminals") without concern for compatibility. Implementation of the H.323 standard intends to allow for interoperability of applications from different vendors.

However, interoperability issues do come up. For example, some terminals may implement only a subset of the H.323 standard or interpret some fields differently. Terminals also lack capabilities that prevent their complete integration in and readiness for the IP telephony. Terminals do not perform functions such as authentication, billing and call cutoff, and cannot find an appropriate gateway to connect to. Normally, terminals are connected to the Internet intermittently, only when logged on. Hence, terminals are not always ready to accept incoming calls. Finally, when calling a destination terminal, telephone users do not know the IP address of destination terminal. The present invention addresses the aforementioned interoperability issues and related problems.

SUMMARY OF THE INVENTION

A preferred embodiment of the present invention provides a telephony system, proxy gateway and method for voice over Internet protocol (VoIP) telephony. In accordance with the purpose of the invention, as embodied and broadly described herein, the invention relates to a proxy gateway for the VoIP telephony. The proxy gateway bridges between VoIP single user device terminals (terminals) attached to the Internet and telephone devices attached to a telephone network through a VoIP gateway.

The proxy gateway fundamentally improvement VoIP telephony by addressing interoperability among diverse devices on the Internet and by providing enforcement of call authorization and credit policies. In addition, the proxy gateway provides for call setup, call proceeding and call termination. The proxy gateway decides when to initiate call termination based on, for example, exhausted credit. The proxy gateway is further capable of prompting an Internet terminal device directory service to look up for an IP address of a called terminal, when a telephone calls the terminal. The look up is based on a telephone number of the called terminal that the proxy gateway receives from the telephone via the gateway. The proxy gateway bridging, via the gateway, between a telephone network to which the telephone is connected and the called terminal.

The proxy gateway includes a terminal portion and a gateway portion. The gateway portion is coexisting and in communications with the terminal portion. The proxy gateway is capable of interfacing with a gatekeeper and a gateway. The proxy gateway is further capable of interfacing with at least one terminal via a network to which the at least one terminal is attached. The proxy gateway uses its terminal portion for interfacing with the at least one terminal. The proxy gateway uses its gateway portion for interfacing with the gateway and gatekeeper.

In further accordance with the purpose of the invention, as embodied and broadly described herein, the invention further relates to a telephony system in which at least one proxy gateway is deployed. The telephony system includes a network and at least one terminal attached to the network. The Internet is a suitable network for implementing the invention.

The telephony system additionally includes a gatekeeper and a gateway communicating with the gatekeeper and interfacing between a telephone network and, via the network, the at least one terminal. The telephony system further includes the proxy gateway.

The proxy gateway communicates with the gatekeeper, the at least one terminal and the gateway. The proxy gateway has dual characteristics manifested by a gateway portion and a terminal portion so that with respect to the at least one terminal the proxy gateway behaves as a terminal and so that with respect to the gateway the proxy gate behaves as a gateway.

In further accordance with the purpose of the invention, as embodied and broadly described herein, the invention also relates to a method for establishing the VoIP telephony using the proxy gateway. The method includes establishing the terminal and the gateway portions within the proxy gateway so that the terminal and gateway portions coexist in the proxy gateway and produce the dual characteristics of the proxy gateway. The method also includes establishing communications between the terminal portion and the gateway portion of the proxy gateway.

In order to bridge between the at least one terminal and the telephone network for voice communications, an interface is established between the proxy gateway and the at least one terminal, gateway and gatekeeper.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF A PREFERRED EMBODIMENT

Reference will now by made in detail to a preferred embodiment of the invention, examples of which are illustrated in the accompanying drawings. Wherever convenient, the same reference numbers will be used throughout the drawings to refer to the same of like parts.

The present invention is related to network communications and, specifically, to voice over (OV) Internet protocol (IP) telephony. The invention provides a VoIP proxy gateway for addressing the various interoperability issues and related problems. Voice communications bandwidth and efficiency are significantly improved by the deployment of VoIP proxy gateways.

Figure 1:
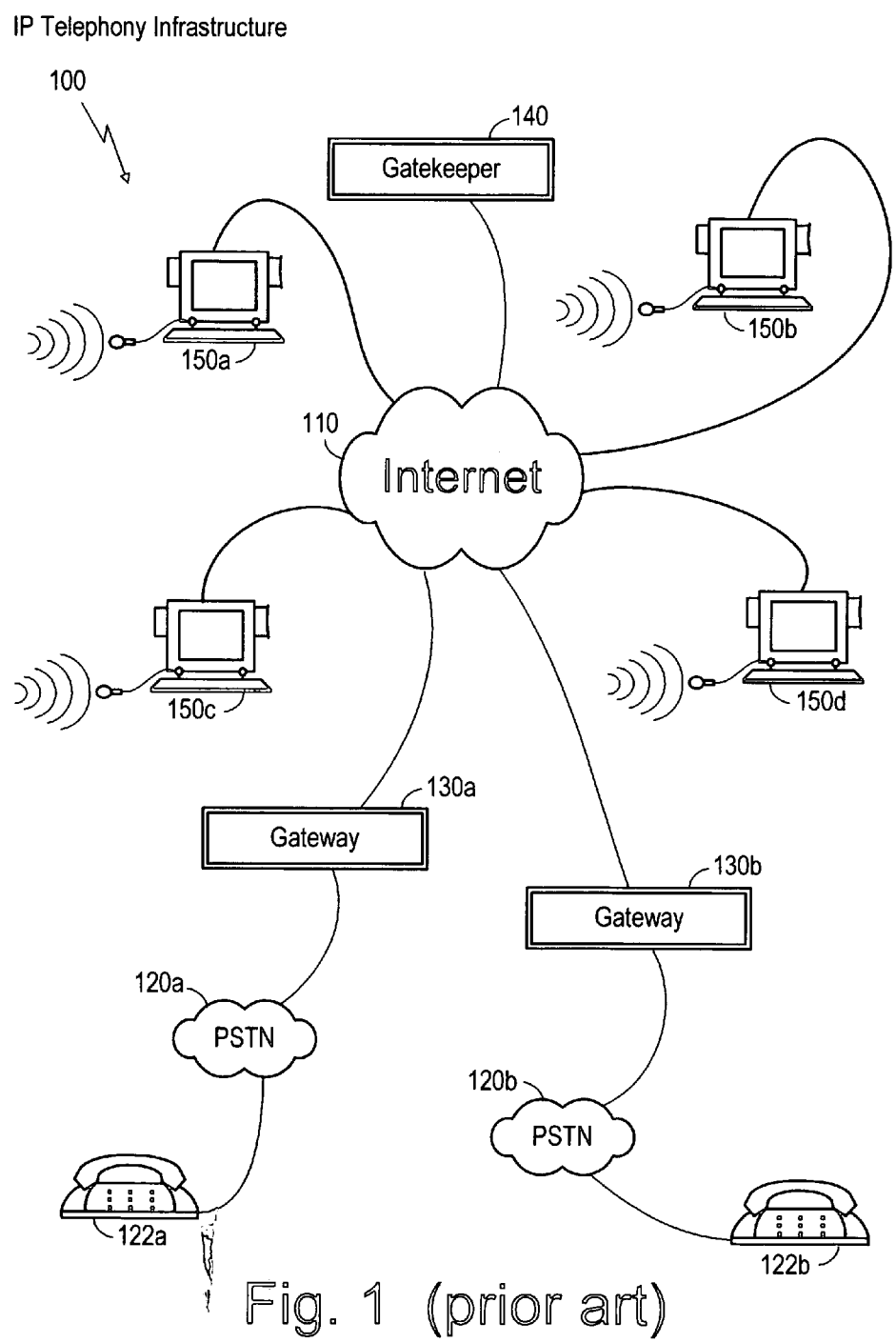
FIG. 1 illustrates an exemplary IP telephony infrastructure.
Figure 2:
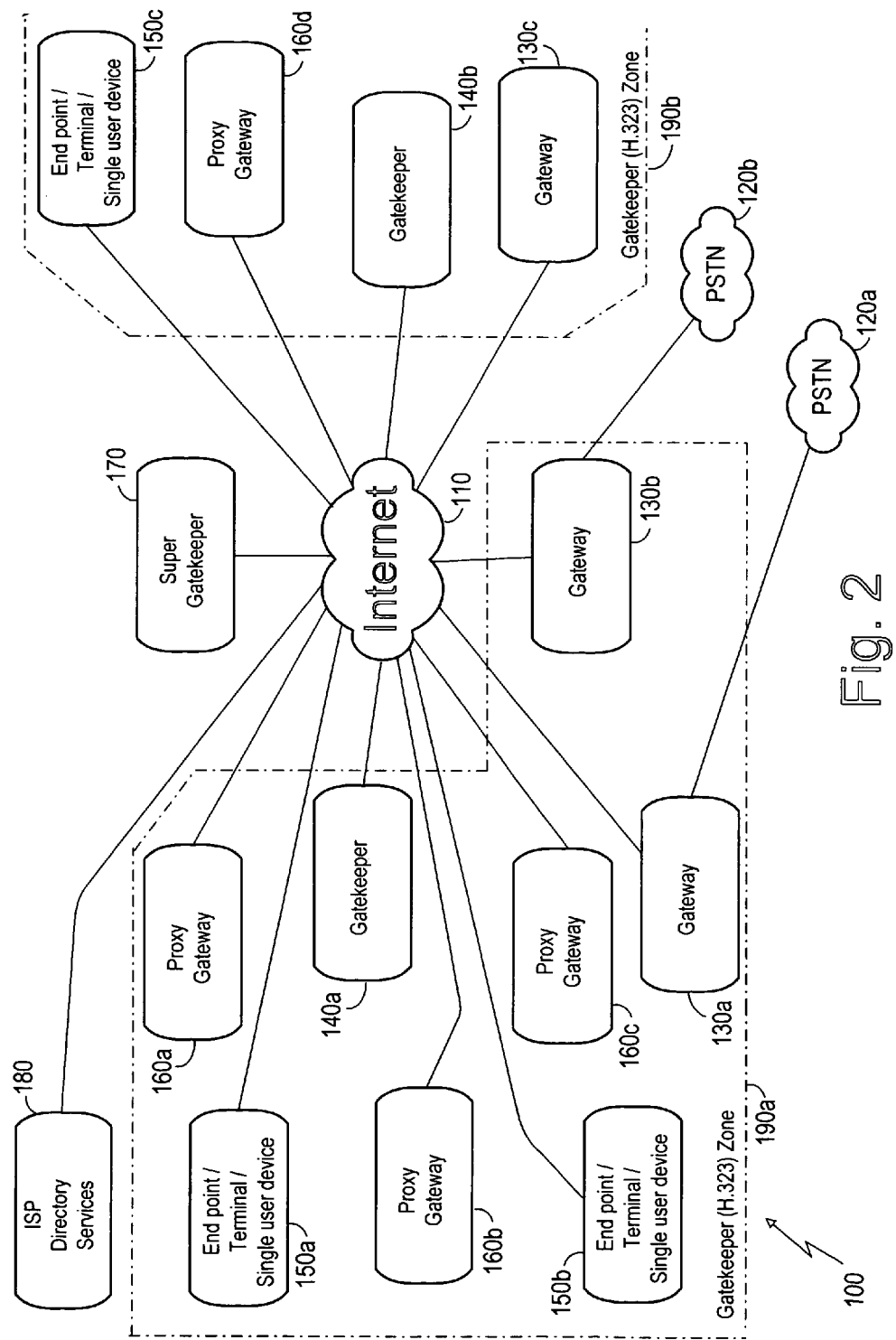
FIG. 2 illustrates an IP telephony infrastructure in accordance with an embodiment of the invention.

FIG. 2 illustrates an IP telephony infrastructure in accordance with an embodiment of the invention. In the IP telephony infrastructure 100, gateways 130 are essential components for bridging between traditional telephone networks, the public switched telephone networks (PSTN) 120, and the Internet 110. It is noted that although this discussion focuses on the Internet and IP, different protocols and other networks, such as an intranet, LAN etc., will not depart from the scope and spirit of the present invention.

Gateways 130, such as the InfoGate provided by Inno-Media, Inc. of San Jose, Calif., offer the advantages of IP telephony to standard telephones. Gateways 130 enable telephone users to communicate with sound-enabled computer users without actually knowing the IP address of these computers. IP addresses are assigned to computers when they log-on to the Internet. Every time a computer logs-on the Internet a new IP address is assigned to it.

Figure 3:
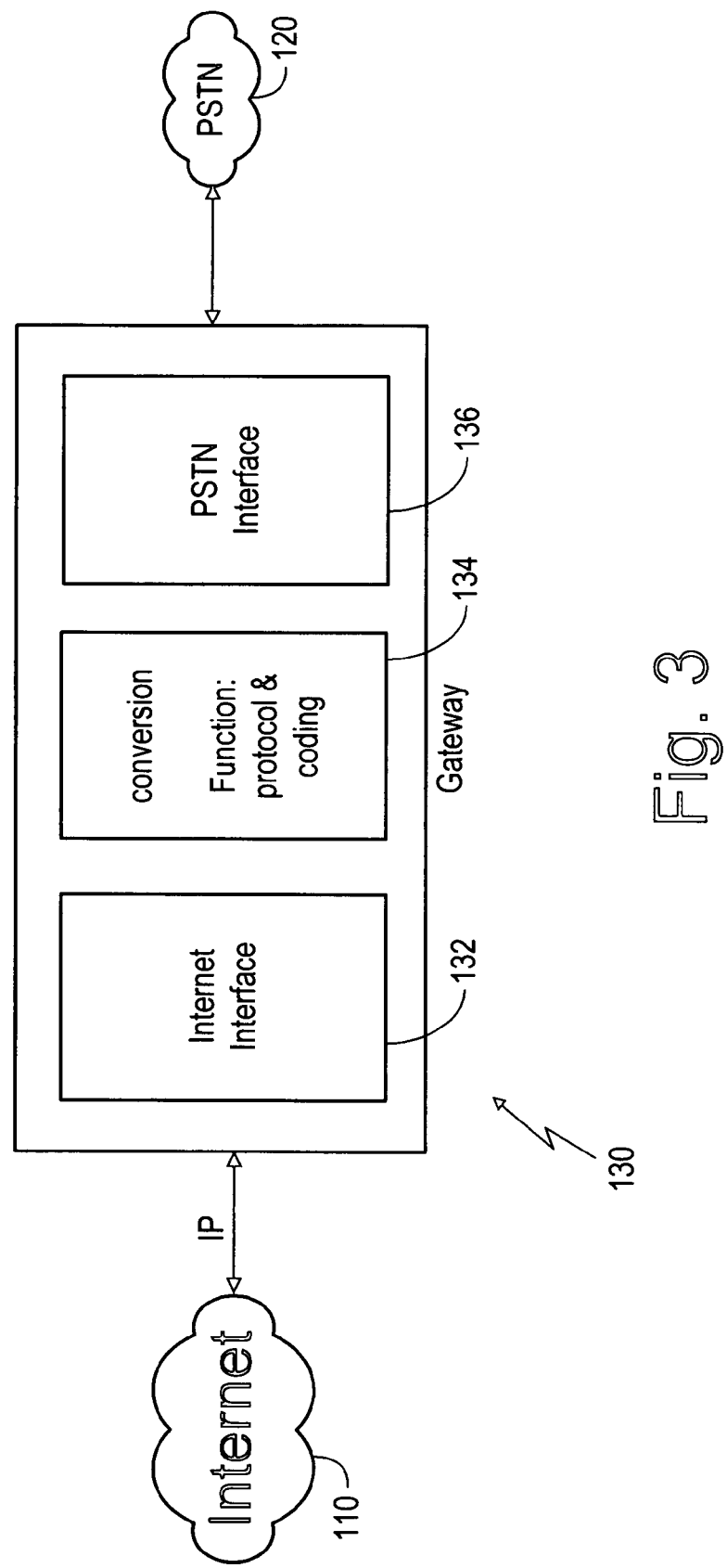
FIG. 3 illustrates the functionality of a gateway.

For a description of gateways 130 in the IP telephony infrastructure, this discussion refers to both FIG. 2 and FIG. 3. FIG. 3 illustrates the functionality of a gateway 130. In general, a gateway 130 has three functional elements. On one side, the gateway 130 connects to the Internet 110, and for this connection the gateway 130 has an Internet interface 132. On the other side, the gateway 130 connects to the telephone network 120, and for that connection the gateway has a telephone network interface 136. As shown, for a connection to the PSTN 120 the gateway 130 has a PSTN interface 136.

In the context of the invention, any device that can be deployed for IP telephony, such as a sound-enabled computer, including a personal computer (PC) with multimedia software, a terminal or a single user device (SUD), is referred to as a "terminal." Terminals and telephones, whether call source or call destination, are collectively referred to as "endpoints."

Through the Internet 110, the gateway 130 can communicate with any terminal that is logged on the Internet 110. The gateway 130 has a conversion function element 134 for bridging between the Internet 110 and the telephone network 120. The conversion function element 134 provides a protocol and coding conversion for calls in both directions, telephone-to-terminal and terminal-to-telephone.

In the telephone-to terminal direction the gateway 130 receives a telephone signal from the telephone network 120. The gateway 130 then compresses and packetizes the signal for transmission to the endpoint (terminal) over the Internet 110. The gateway can also digitizes the telephone signal if the received telephone signal is in analog form. In the terminal-to-telephone direction, the gateway 130 receives packets from the Internet 110 and converts the packets to a telephone signal to be transmitted over the telephone network 120 to the endpoint (telephone). The operations in either direction can occur simultaneously with the operations in the other direction. Hence, the gateway 130 provides for a two-way conversation. In other words, calls are full duplex.

As shown in FIG. 2, the Internet 110 is a network interconnecting terminals 150 for voice and data communications. With regards to terminal-to-terminal communications, the Internet 110 continues to provide a 'charge-free' communications network. Namely, apart from the normal Internet connection cost, there is no additional charge for terminal-to terminal communications, whether voice or data.

Figure 4:
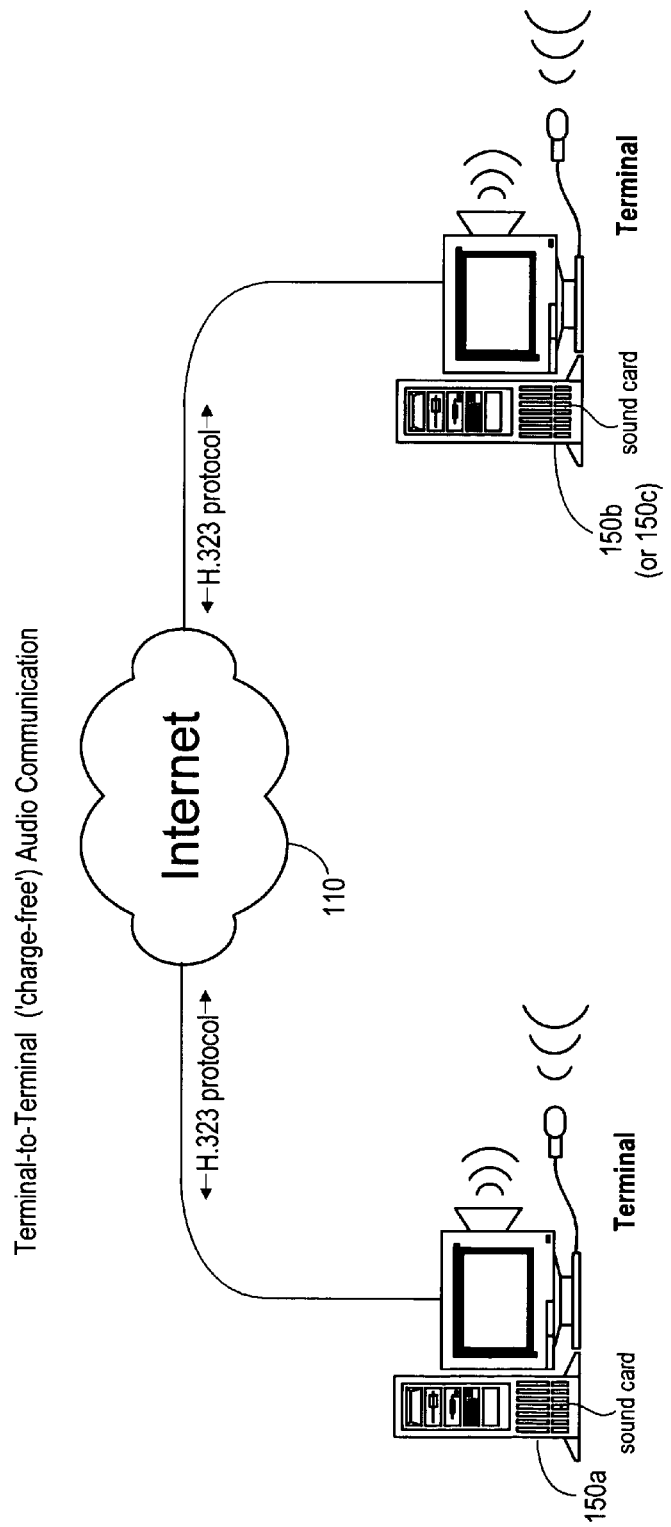
FIG. 4 illustrates terminal-to terminal communications via the Internet using an Internet protocol compliant with the H.323 standard.

FIG. 4 illustrates terminal-to terminal communications via the Internet using an Internet protocol compliant with the H.323 standard.

The H.323 standard is a communications standard that covers the technical requirements for audio, video, and data communications across IP-based networks, including the Internet. The H.323 standard applies to stand-alone devices, embedded PC technology etc. H.323 addresses call control, multimedia management, bandwidth management and interfaces between networks.

H.323 establishes, for example, codec standards for compression and decompression of audio and video data. H.323 establishes also call setup and control protocols. H.323 is designed to run on top of common network architecture and is not platform dependent. Platforms including video-enabled PCs, dedicated platforms, IP-enabled telephone handsets, Cable-TV set-top boxes etc., can become H.323-compliant. (Such platforms can also be collectively referred to as "terminals").

H.323 specifies technical requirements of components in a network-based communications system including an IP-based network. Components defined by the H.323 standard include, for example, terminals, gateways and gatekeepers.

With reference again to the IP telephony infrastructure 100 of FIG. 2, gateways 130 and gatekeepers are generally included. A Gatekeeper 140 is an important component of an H.323-compliant network that forms the IP infrastructure 100. Each gatekeeper 140 is associated with a gatekeeper zone (also referred to as the "H.323 zone) 190. The gatekeeper 140 acts as a central point for calls within its respective zone 190 and provides call control services to registered endpoints. Gatekeepers are capable of routing calls and making call re-routing decisions if called endpoints are unavailable. In order to make use of the services of a gatekeeper 140, all gateways 130 within the gatekeeper zone 190 need to register with the gatekeeper 140. The IP telephony infrastructure can include a super gateway 170 that provides a link between gatekeepers 140 in different gatekeeper zones 190.

Figure 5:
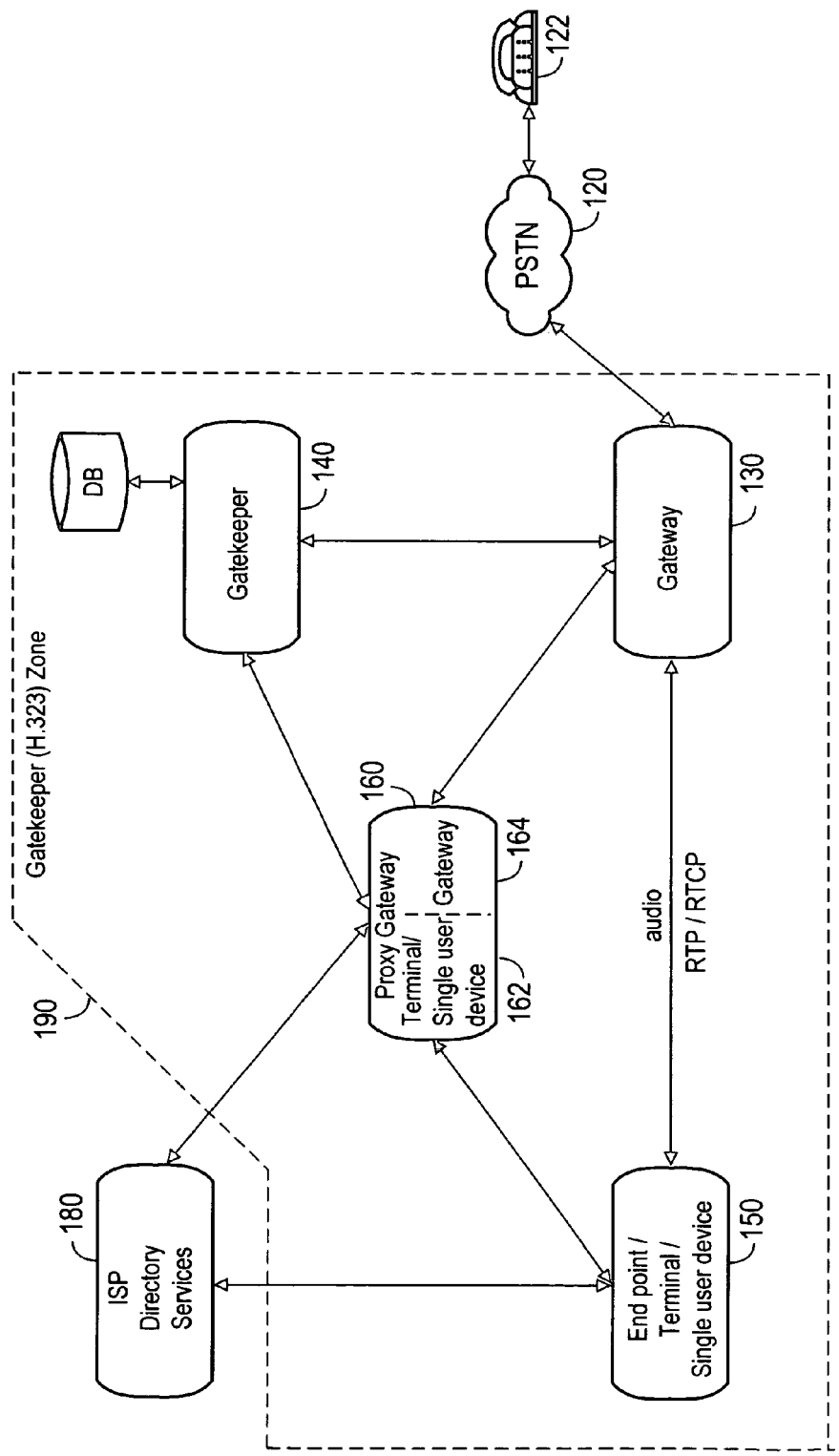
FIG. 5 illustrates a VoIP proxy gateway in the IP telephony infrastructure.

One, or more than one, VoIP proxy gateway 160 is added to the IP telephony infrastructure 100 in order to fill interoperability gaps. To that end, the VoIP proxy gateway 160 exhibits dual characteristics by integrating terminal and gateway functionality into the VoIP proxy gateway 160. FIG. 5 illustrates a VoIP proxy gateway in the IP telephony infrastructure.

The terminal functionality of the VoIP proxy gateway 160 is shown as the terminal portion 162. The gateway functionality of the VoIP proxy gateway 160 is shown as the gateway portion 164. By working partly as a gateway and partly as a terminal, the VoIP proxy gateway 160 establishes a bridge between terminals 150 and gateways 130 and gatekeepers 140. It is noted that, as shown in FIG. 2, the IP telephony infrastructure can include a super gateway 170. The VoIP proxy gateway 160 can interface with the super gatekeeper 170 to provide services that span beyond the gatekeeper zone 190 to which the VoIP proxy gateway 160 belongs.

The terminal portion 162 is capable of communicating with an terminal device 180. The terminal device directory service 180 includes the IP addresses of terminals 150 registered therewith (logged-on the Internet). The terminal portion 162 interfaces with the terminal device directory service by, first, registering and, secondly, being treated as a terminal. The terminal portion 162 can retrieve from the terminal device directory service 180 IP addresses of other registered terminals 150.

There can be multiple VoIP proxy gateways 160 registered with the terminal device directory service 180 (see FIG. 2). Each of the multiple VoIP proxy gateways 160 can be designated to support, for example, a certain range of telephone numbers. The telephone numbers may be partitioned by area code or some other suitable criteria. Alternatively, a single group of users (or telephone numbers) may be serviced by multiple VoIP proxy gateways 160. This arrangement allows the multiple VoIP proxy gateways to service overlapping portions of the entire range and, thereby, provide service that covers the entire range.

To balance the load among the multiple VoIP proxy gateways 160, the terminal device directory service 180 can be designed to follow a load balancing scheme (e.g., round robin load distribution, least recently used, etc.). Additionally, VoIP proxy gateways 160 can monitor each other's fitness or failure. Upon discovering a failure, the remaining active VoIP proxy gateways 160 can initiate a fail-over procedure to overcome this failure. This feature is termed fault tolerance. Fault tolerance allows the IP telephony infrastructure to continue operating in the event of a failure.

The gateway portion 164 of the VoIP gateway 160 interfaces with gateways 130 and gatekeepers 140 to facilitate call control. The gateway portion 164 registers with the gatekeeper 140 to establish an interface therebetween. Instead of registering an area code with the gatekeeper 140, the gateway portion 164 registers a routing code. In any other respect, once registered, the VoIP proxy gateway 160 is treated by the gatekeeper 140 as any other gateway 130 in its gatekeeper zone 190.

It is noted that, even though the gatekeeper 140 may provide a user authentication capability, a gatekeeper 140 does not enforce user authorization and credit policies. A user authentication can be implemented through a user identification (ID), password, caller ID or any combination thereof.

The VoIP proxy gateway 160 provides the enforcement of authorization and credit policies. The VoIP proxy gateway 160 may use any one or a combination of a number of authorization models. One of the authorization models is the ID model that utilizes a calling card number. A second authorization model is the password model that utilizes a user-defined code. A third authorization model, the caller ID model, utilizes the identity (e.g., number) of the calling telephone to perform an automatic authentication of the user. A fourth authorization model, the ID-plus-password model, utilizes a combination of the user's account number and password. A fifth authorization model, the caller-ID-Password model, combines the calling telephone identification and the user's password.

In enforcing the credit policy, the VoIP proxy gateway 160 utilizes the user's credit information, as will be later explained with reference to FIGS. 6a–c, 7a and 7b. In essence, during a call the VoIP proxy gateway 160 monitors the user's credit information. Based on the credit information, the VoIP proxy gateway 160 can inform the gatekeeper of remaining credit, decide to terminate the call and/or ask for new credit information (e.g., credit card number and amount).

In addition to enforcing authorization and credit policies, the VoIP proxy gateway 160 provides a terminal IP address in telephone-to-terminal calls. Moreover, in cases where the terminal 150 is not logged on and not registered with the terminal device directory service 180, the VoIP proxy gateway 160 initiates a call to the terminal, via the telephone network (PSTN) 120. The call intends to force the terminal 150 to log on the Internet so that an IP address can be assigned to the terminal 150. Once the terminal 150 is logged on and registered with the terminal device directory service 180, the VoIP proxy gateway 160 can obtain the IP address of the terminal 150 and provide it to the designated gateway 130.

Figure 6A:
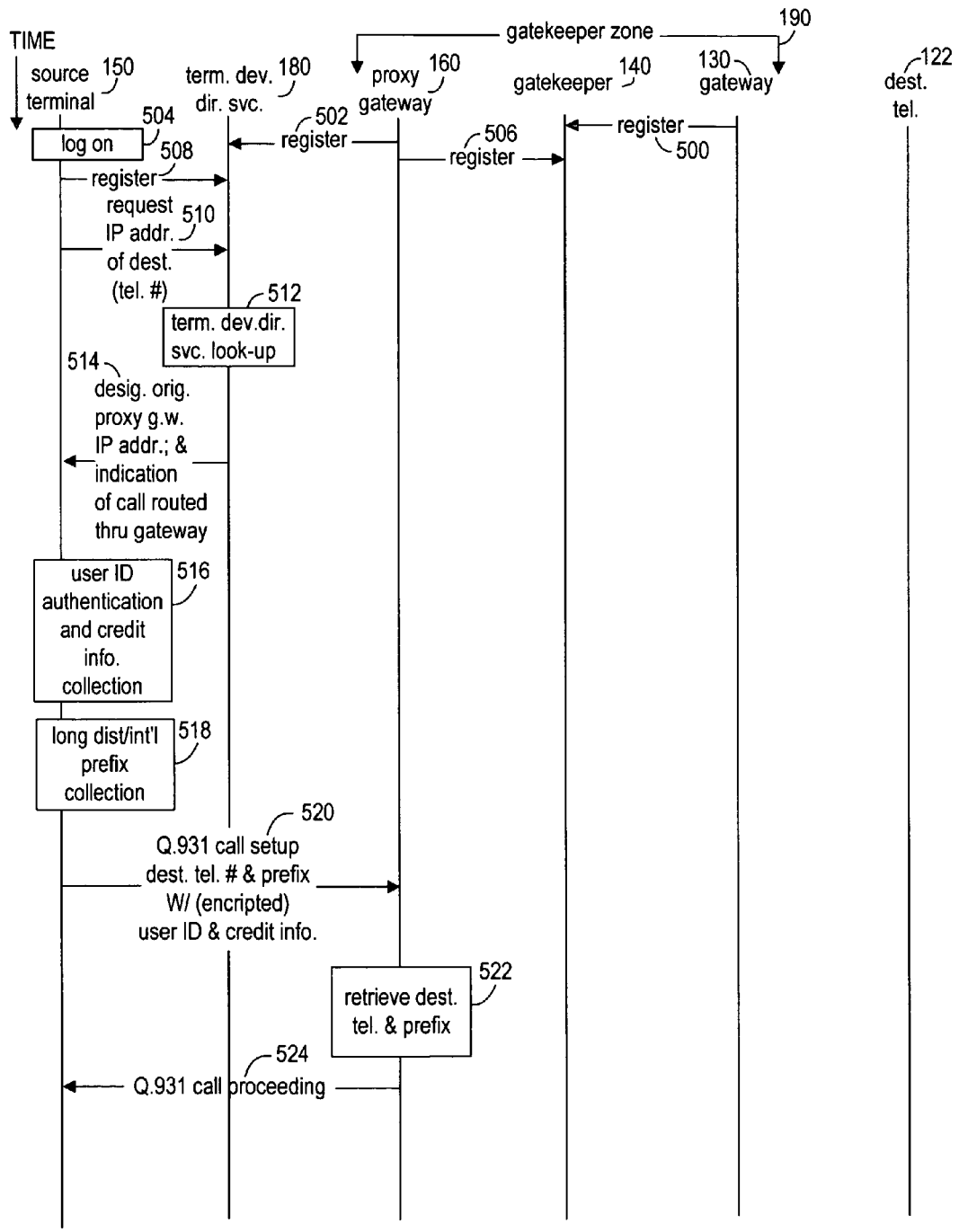
FIGS. 6a–6c are a time flow diagram of the VoIP proxy gateway interaction with terminals, gateways and gatekeepers during a terminal-to-telephone calls.
Figure 6B:
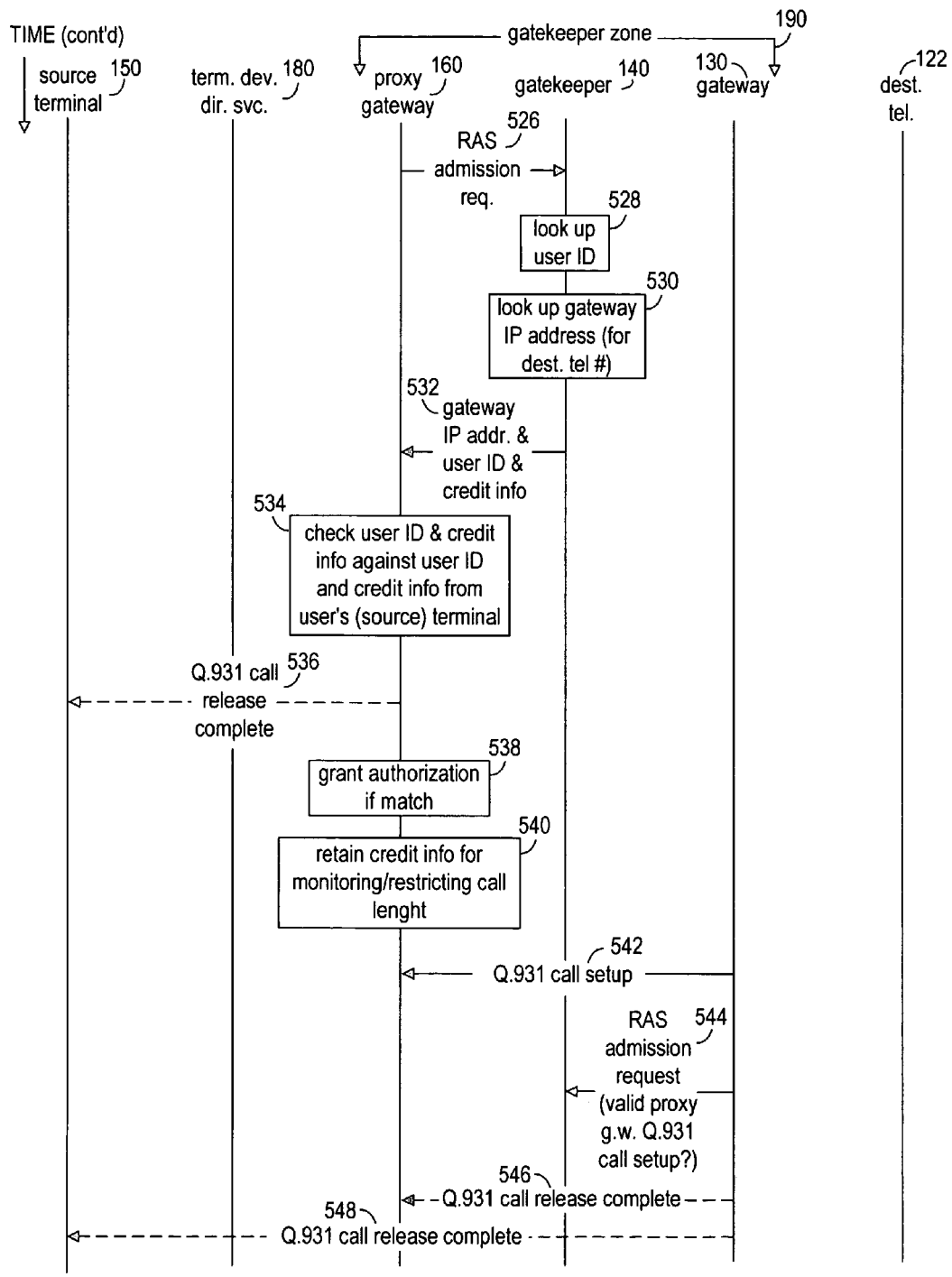
Figure 6C:
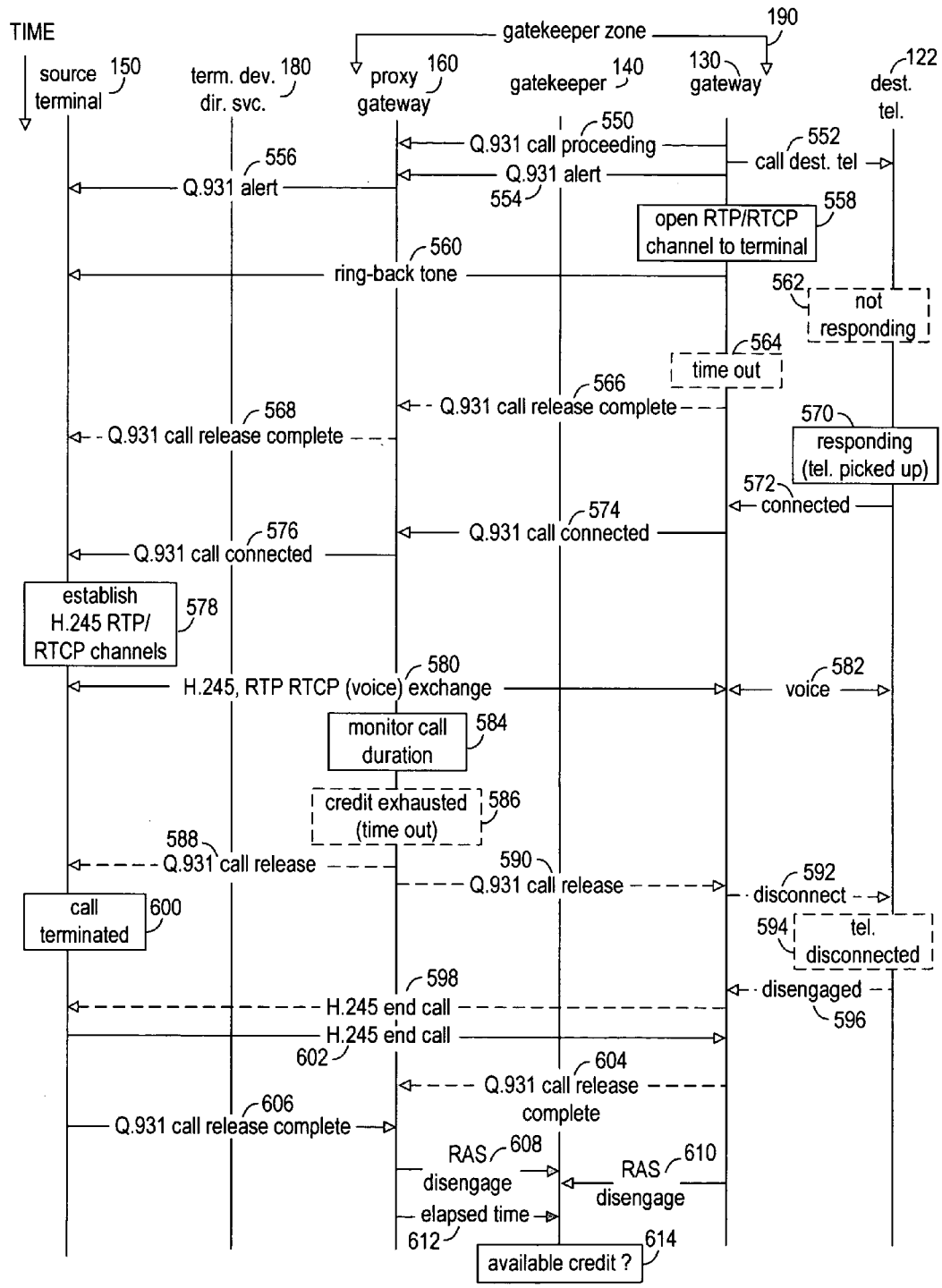

As mentioned before, by working partly as a gateway and partly as a terminal, the VoIP proxy gateway 160 establishes a bridge between terminals 150 and gateways 130 and gatekeepers 140. FIGS. 6a–c are a time flow diagram of the VoIP proxy gateway interaction with terminals, gateways and gatekeepers during a terminal-to-telephone calls.

The time flow diagram of FIGS. 6a–c starts with the terminal 150 logging on the Internet, via step 504, and registering with the terminal device directory service 180, via step 508. The terminal 150 initiates a call, via step 510, by issuing a request for an IP address of a designated gateway 130. This gateway is designated to service the range of telephone numbers that include the number of the destination telephone 122. A terminal device directory service look-up is performed, via step 512. The look-up key is the destination telephone number. The result of this look-up is the IP address of the VoIP proxy gateway 160 that is designated to service the area code or range of numbers that include the destination telephone number. The terminal device directory service 180 responds with the designated VoIP proxy gateway IP address and an indication that the call is being routed through a gateway (the VoIP proxy gateway 160), via step 514.

The terminal device directory service 180 obtains the IP address of the VoIP proxy gateway 160 when the VoIP proxy gateway 160 logs on the Internet and registers, via step 502, with the terminal device directory service 180. The VoIP proxy gateway 160 registers also with the gatekeeper 140, via step 506. Likewise, the gateway(s) 130 in the gatekeeper (H.323) zone 190 register(s) with the gatekeeper, via step 500. The order of registration is not critical. The only requirement is that the terminal, VoIP proxy gate and gateway(s) are each registered before their information (e.g., IP address) or participation is needed.

Next, the terminal 150 prompts the user to enter user ID and credit information, via step 516. The user ID is used for authentication. In addition to the telephone number, the terminal also collects the long distance or international prefix of the destination, via step 518.

The terminal 150 sends to the VoIP proxy gateway a Q.931 call setup message with the telephone number and prefix, user ID and credit information, via step 520. The Q.931 is a call signaling protocol under the H.323 protocol umbrella. The call signaling protocol, Q.931, establishes a connection between the two endpoints (terminal and telephone) via the VoIP proxy gateway 160 and gateway 130, as will be further explained below. The Q.931 call setup message leads to initiation of call setup procedure by the VoIP proxy gateway 160. The destination telephone number and prefix code is sent through a standard field of the Q.931 setup message (step 522). The user authorization information is sent to the VoIP proxy gateway 160 through the user data of the Q.931 setup message. The VoIP proxy gateway 160 then sends a Q.931 call proceeding to the terminal 150, via step 524, acknowledging initiation of the call setup.

Thereafter, the VoIP proxy gateway 160 sends to the gatekeeper 140 an RAS (registration addressing status) admission request, via step 526 (FIG. 6b). RAS signaling opens a channel between gateways and the gatekeeper. The RAS admission request from the VoIP proxy gateway 160 in the zone of the gatekeeper 140, opens a channel between the VoIP proxy gateway 160 and this gatekeeper 140 and specifies a requested call bandwidth. The VoIP proxy gateway 160 additionally provides to the gatekeeper 140 the terminal 150 identification (IP address or telephone number). The call signaling channel can be further opened to another gateway 130 chosen by the gatekeeper 140.

In response to the RAS admission request, the gatekeeper 140 performs a user ID lookup based on the identification (IP address or telephone number) of the terminal 150, via step 528. In addition, the gatekeeper 140 obtains, in step 530, the IP address of a gateway 130 designated to service the call to the destination telephone 122 via the telephone network.

Also in response to the RAS admission request, the user ID, credit information and IP address of the designated gateway 130 are sent by the gatekeeper 140 to the VoIP proxy gateway 160, via step 532. The VoIP proxy gateway 160 then checks this user ID and credit information against the user ID and credit information it received from the terminal 150, via step 534.

If there is no match and the user ID from the terminal is proved invalid, the VoIP proxy gateway sends to the terminal 150 a Q.931 call release complete, via step 536. This message leads to initiation of call disconnect by the terminal 150. Also, if the user ID is proved valid but the credit information indicates no more credit available for the call, the VoIP proxy gateway 160 sends to the terminal 150 the Q.931 call release complete or, alternatively, a request for new credit.

Conversely, if both the user ID and credit information are verified by the VoIP proxy gateway 160, the VoIP proxy gateway authorizes the call in step 538. The VoIP proxy gateway 160 retains the credit information, via step 540, so that it can monitor the time laps of the call in progress.

Next, the VoIP proxy gateway 160 sends a Q.931 call setup to the IP address of the designated gateway 130, via step 542. This will establish a connection between the VoIP proxy gateway 160 and the designated gateway 130.

In response, this gateway 130 sends to the gatekeeper 140 an RAS admission request, via step 544. In so doing, the gateway 130 verifies the validity of the call setup request from the VoIP proxy gateway 160. If the request is not verified (invalid IP address), the gateway sends to the VoIP proxy gateway 160 and the terminal 150 a Q.931 call release complete message, via steps 546 and 548. This message leads to initiation of call disconnect by the VoIP proxy gateway 160 and the terminal 150. Conversely, if the request from the VoIP proxy gateway 160 is verified, the gateway sends to the VoIP proxy gateway 160 a Q.931 call proceeding message, in step 550 (FIG. 6c). In addition, the gateway 130 sends a ring tone to the destination telephone 122, via step 552.

Next, the gateway 130 sends to the VoIP proxy gateway 160 a Q.931 alert message and, in turn, the VoIP proxy gateway 160 forwards this message to the terminal 150, via steps 554 and 556, respectively. The gateway further sends a ring-back tone to the terminal 150 after the gateway 130 opens an RTP/RTCP (real-time protocol/real-time control protocol) channel to the terminal 150 (steps 560 and 558, respectively).

If there is no response to the ring tone sent to the destination telephone 122, the gateway 130 determines the occurrence of a time out event (step 564). On detecting a time out event occurrence, the gateway sends to the VoIP proxy gateway 160 a Q.931 call release complete message, via step 566. The VoIP proxy gateway 160, in turn, forwards this message to the terminal 150.

If the destination telephone user responds to the ring tone (step 570), the gateway 130 will detect the connection (response) and send a Q.931 call connected message to the VoIP proxy gateway 160. The VoIP proxy gateway 160 will forward this message to the terminal 150, via step 576. Upon receiving this message, the terminal establishes an RTP/RTCP channel to the gateway 130.

Bi-directional voice communications follow through the gateway 130, between the terminal 150 and the destination telephone 122, via steps 580 and 582. On the gateway-to-terminal leg of the communications, the exchange conforms with the H.245 protocol. The H.245 protocol under the umbrella of the H.323 protocol applies to endpoint-to-endpoint voice communications.

During the bi-directional voice communications, the VoIP proxy gateway 160 monitors the call duration in order to enforce the credit policy (step 584). If the terminal user's credit is exhausted, the VoIP proxy gateway 160 can respond in one of two ways. The VoIP proxy gateway 160 can either send to the terminal 150 a Q.931 call release complete message (588) or send to the terminal 150 a new credit request not shown). Detecting an exhausted credit also prompts the VoIP proxy gateway 160 to send to the gateway a Q.931 call release complete message, via step 590. The gateway 130, in turn, initiates a call disconnect, via step 592.

Termination of the call can be additionally caused by either one of the users, the terminal user or the destination telephone user (steps 594, 596 and 598 or steps 600 and 602). When the gateway 130 detects a call termination by the destination telephone, it sends to the VoIP proxy gateway 160 a Q.931 call release complete message, via step 604. Alternatively, when the terminal user terminates the call, the terminal 150 sends to the VoIP proxy gateway 160 the Q.931 call release complete message. In either case, the VoIP proxy gateway 160 and gateway 130 send an RAS disengage message to the gatekeeper 140 (steps 608 and 610).

Upon termination of the call, the VoIP proxy gateway 160 sends to the gatekeeper 140 the call duration (elapsed time) information so that the gatekeeper 140 can update the user-related credit information (steps 612 and 614). The gatekeeper maintains for future use the user ID and credit information in a database, table or other suitable format.

Figure 7A:
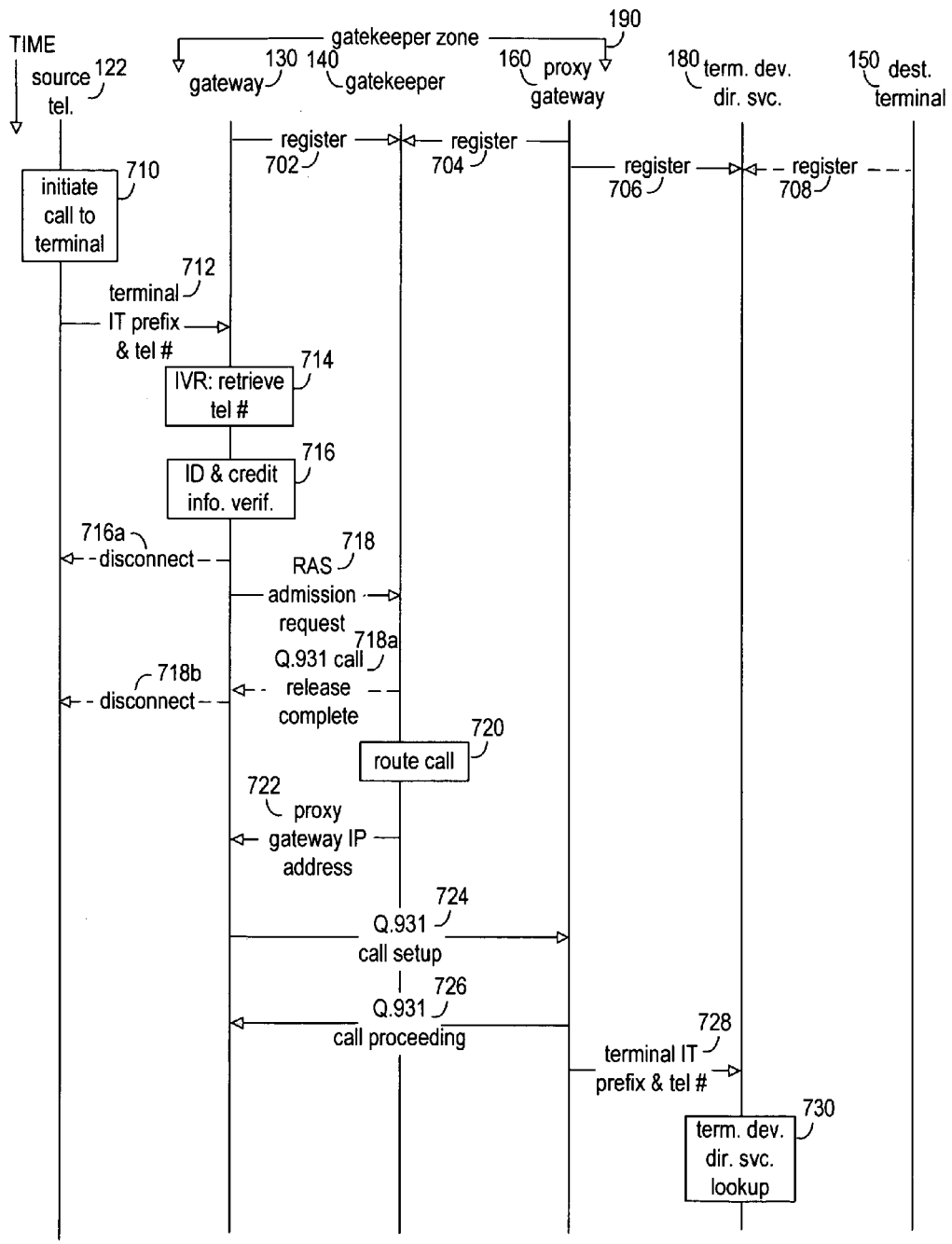
FIGS. 7a and 7b are a time flow diagram of the VoIP proxy gateway interaction with terminals, gateways and gatekeepers during a telephone-to-terminal calls.
Figure 7B:
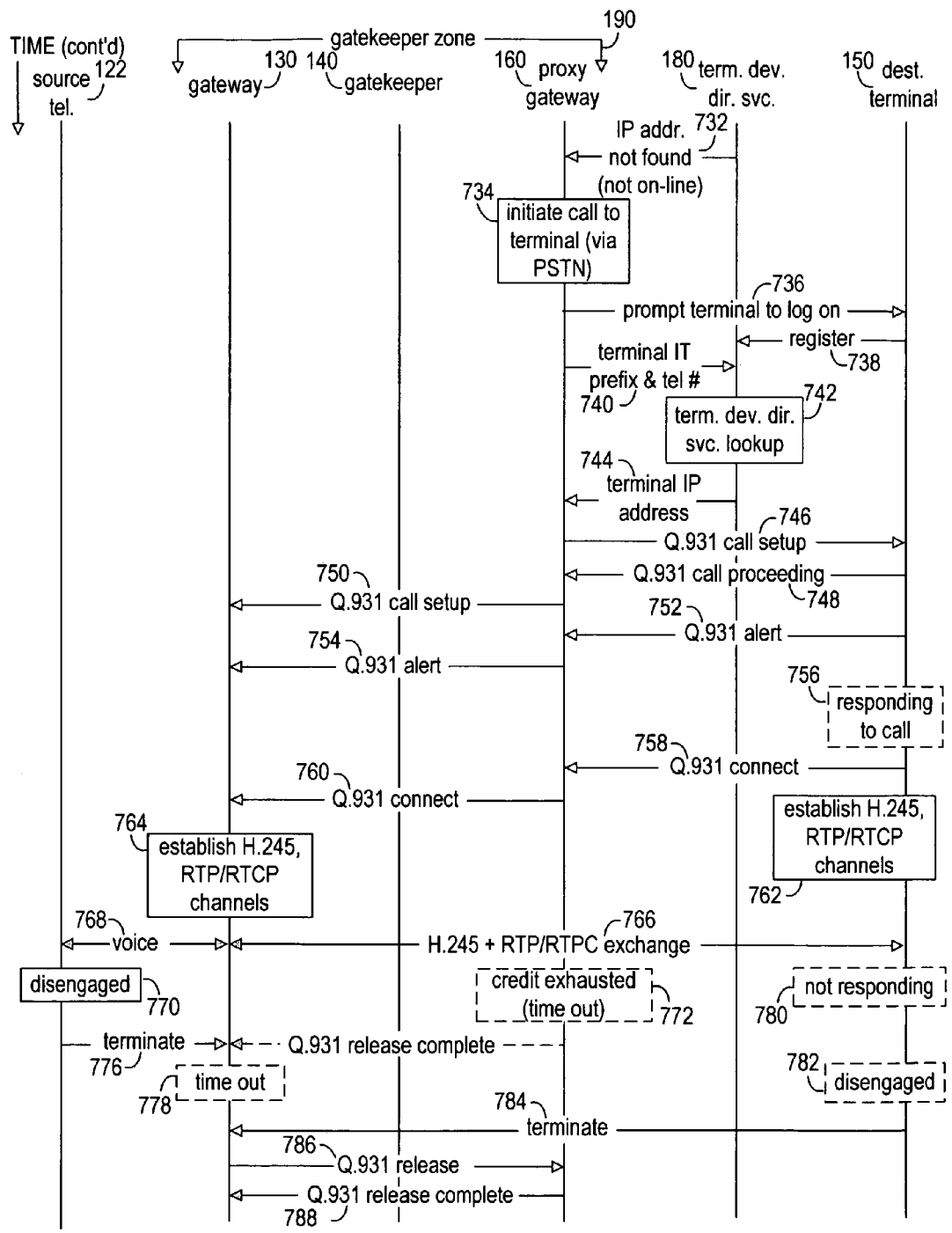

FIGS. 7a and 7b are a time flow diagram of the VoIP proxy gateway interaction with terminals, gateways and gatekeepers during a telephone-to-terminal calls.

The time flow diagram of FIGS. 7a and 7b starts with a telephone 122 initiating a call to a destination terminal 150 (step 710). The telephone 122 sends an Internet telephony (IT) prefix and destination telephone number to a gateway 130 designated to service the area code associated with this telephone, via step 712. Together with the VoIP proxy gateway 160, this gateway 130 is in a gatekeeper zone (H.323 zone) of gatekeeper 140.

Initially, the gateway 130 and the VoIP proxy gateway 160 register with the gatekeeper 140, via respective steps 702 and 704. Also, at some point before or after the gatekeeper registration, the VoIP proxy gateway 160 registers with the terminal device directory service 180.

It may be recalled that, in general, terminals are intermittently logged on the Internet. Therefore, the destination terminal 150 may or may not be logged on the Internet and registered with the terminal device directory service 180 (step 708). If not, VoIP proxy gateway 160 will force the terminal 150 to log on the Internet, as will be later explained.

The gateway 130 executes an IVR (step 714) to collect the destination terminal telephone, dialing prefix and account number plus password received from the telephone 122, step 716. Before allowing the call to proceed, the gateway 130 verifies the caller's identification (calling card number etc.) and credit information (step 716). If the caller's information is not verified (e.g., call is not authorized), the gateway 130 sends a disconnect signal to the source telephone 122 (step 716a), and the call ends. However, if the caller's information is verified, the gateway 130 then sends an RAS admission request to the gatekeeper 140, step 718. If this admission request fails, the gatekeeper 140 sends to the gateway 130 a Q.931 call release complete message (step 718a). The gatekeeper 130, in turn, sends a disconnect signal to the source telephone 122 (step 118b), and the call ends. If, conversely, this admission request succeeds, the gatekeeper 140 then routes the call to the designated VoIP proxy gateway 160 (step 720).

It may be recalled that there may be multiple VoIP proxy gateways in the gatekeeper zone. One or more of the VoIP proxy gateways is designated to service the area code of the destination terminal. Accordingly, the gatekeeper 140 provides the IP address of the designated VoIP proxy gateway 160 to the gateway 130 (step 722). After receiving the IP address of the VoIP proxy gateway 160, the gateway 130, sends a Q.931 call setup to the VoIP proxy gateway 160 (step 724). The VoIP proxy gateway 160 then responds with a Q.931 call proceeding message (step 724).

Next, the VoIP proxy gateway 160 prompts the terminal device directory service 180 to look for the IP address of the destination terminal 150 (step 728). The IP address lookup is needed because the gateway 130 is typically not familiar with and does not provide the destination terminal IP address. In other words, by obtaining the IP address the VoIP proxy gateway 160 helps fill the gap that is created when the IP address of the destination terminal is unknown to the telephone user. The terminal device directory service 180 performs a lookup using the destination terminal number and prefix as a lookup key (step 730).

If the terminal 150 has not previously logged on the Internet and registered with the terminal device directory services 180 then no IP address is assigned to it. If so, the terminal device directory service 180 returns an IP address not found indication to the VoIP proxy gateway 160, via step 732 (FIG. 7b). In response, the VoIP proxy gateway 160 initiates a call to the terminal in order to prompt it to go on line (log on) and accept the call or reject the call (steps 734 and 736). The call to the terminal 150 can indicate that an IT call is coming in and allow the destination terminal user to later accept or reject the call.

Once the destination terminal 150 is logged on and registered with the terminal device directory service 180, via step 738, the VoIP proxy gateway 160 can again request the IP address of the destination terminal 150 (step 740). The terminal device directory service 180 performs a lookup for the IP address using the destination terminal telephone number as a lookup key (step 742). The destination terminal IP address is then send by the terminal device directory service 180 to the VoIP proxy gateway 160.

Next, the VoIP proxy gateway 160 sends a Q.931 call setup to the IP address of the destination terminal 150 and to the gateway 130, via steps 746 and 750. The destination terminal 150 responds with Q.931 call proceeding and Q.931 alert messages to the VoIP proxy gateway 160, via steps 748 and 752. The VoIP proxy gateway 160 then forwards the Q.931 alert message to the gateway 130 (step 754).

Once the destination terminal 150 accepts the call (e.g. responds to the IT tone), the destination terminal 150 sends a Q.931 connect message to the VoIP proxy gateway 160.

The VoIP proxy gateway 160 forwards this message to the gateway 130, via step 760. In response, the gateway 130 establishes an RTP/RTCP channel to the destination terminal 150 (step 764). Likewise, the terminal establishes an RTP/RTCP channel to the gateway 130, via step 762. As mentioned before, the gateway-to-terminal leg of the bi-directional communications conforms with the H.245 protocol.

Termination of the call can occur as a result of the telephone user's credit being exhausted as determined by the VoIP proxy gateway 160. The VoIP proxy gateway 160 monitors the call duration and compares it against the remaining available credit. When the VoIP proxy gateway 160 finds that the credit is exhausted (step 772) it sends a Q.931 call release complete to the gateway 130 (step 774).

Termination of the call can also occur when the destination terminal does not respond to the call. In this case the gateway 130 detects a time out event (step 778), and sends a Q.931 call release complete to the VoIP proxy gateway 160. Finally, either one of the users, the telephone user or destination terminal user, may cause the termination of the call (steps 770 and 776, or steps 782 and 784). In either case a Q.931 call release complete message is sent to or from the VoIP proxy gateway 160 (steps 786 or 788).

In summary, the invention provides a VoIP proxy gateway. The VoIP proxy gateway exhibits dual characteristics by integrating terminal and gateway functionality in order to fills interoperability gaps. Deployment of the VoIP proxy gateway in an IP telephony infrastructure improves voice communications bandwidth and efficiency.

Other embodiments be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A proxy gateway comprising:
   a terminal portion, the terminal portion being configured to interface with a terminal via a network to which the terminal is connected; and
   a gateway portion coexisting and in communication with the terminal portion, the gateway portion being configured to interface with a gateway and a gatekeeper,
   wherein the proxy gateway is configured to provide for call setup, call proceeding, and call termination,
   wherein the proxy gateway registers with a directory service associated with the proxy gateway and the terminal,
   wherein when a telephone calls a terminal, the proxy gateway is configured to prompt the directory service to look up an IP address of the called terminal, based on a telephone number of the called terminal received from the gateway, the gateway being connected to a telephone network to which the telephone is connected, the proxy gateway bridging the called terminal to the telephone network via the gateway, and
   wherein the proxy gateway is configured to prompt the called terminal to log onto the network so that a new IP address can be assigned to the called terminal when the directory service cannot find any IP address associated with the called terminal, the directory service being configured to provide the new IP address to the proxy gateway.

2. The proxy gateway of claim 1, wherein the proxy gateway bridges the terminal to a telephone network via the gateway.

3. The proxy gateway of claim 1, wherein the proxy gateway is configured to prompt the gatekeeper to look up a user identification and an IP address of the gateway based on information from the terminal, the information comprising an IP address of the terminal, a destination telephone number, and a terminal user identification,
   the proxy gateway using the IP address of the gateway to bridge the terminal to a telephone network to which the destination telephone is connected,
   the proxy gateway comparing the user identification with the terminal user identification before granting call authorization.

4. The proxy gateway of claim 1, wherein the proxy gateway belongs to a zone of the gatekeeper,
   the proxy gateway registering with the gatekeeper in order to establish the interface with the gatekeeper.

5. The proxy gateway of claim 4, wherein the proxy gateway is configured to interface with a super gatekeeper,
   the super gatekeeper bridging between the gatekeeper zone and zones of other gatekeepers.

6. The proxy gateway of claim 1, wherein the proxy gateway is configured to enforce call authorization and user credit policies.

7. The proxy gateway of claim 1, wherein the proxy gateway is configured to facilitate billing.

8. The proxy gateway of claim 1, wherein the proxy gateway is configured to monitor duration of calls, maintain user credit information, and to provide updated caller credit information to the gatekeeper.

9. The proxy gateway of claim 1, wherein the proxy gateway is configured to prompt call termination.

10. The proxy gateway of claim 1, wherein the proxy gateway is configured to monitor time laps of a call and a caller's credit information, and to prompt termination of the call when the caller's credit information indicates credit exhausted.

11. A method of establishing voice over network protocol telephony, the method comprising:
    establishing communications between a terminal portion of a proxy gateway and a gateway portion of the proxy gateway, the proxy gateway being connected to a network, wherein the proxy gateway provides for call setup, call proceeding, and call termination;
    establishing an interface between a gatekeeper and the gateway portion of the proxy gateway, the gatekeeper being connected to the network;
    establishing an interface between a gateway and the gateway portion of the proxy gateway, the gateway being connected to the network and a telephone network; and
    establishing an interface between a terminal and the terminal portion of the proxy gateway, the terminal being connected to the network, the proxy gateway bridging the terminal to the telephone network via the gateway,
    wherein the proxy gateway registers with a directory service associated with the proxy gateway and the terminal, when a telephone calls a terminal, the proxy gateway prompts the directory service to look up an IP address of the called terminal based on a telephone number of the called terminal received from the gateway, the telephone being connected to the telephone network, the proxy gateway bridging the called terminal to the telephone network via the gateway, and
    wherein the proxy gateway prompts the called terminal to log onto the network so that a new IP address can be assigned to the called terminal when the directory service cannot find any IP address associated with the called terminal, the directory service provides the new IP address to the proxy gateway.

12. The method of claim 11, wherein the proxy gateway prompts the gatekeeper to look up a user identification and an IP address of the gateway based on information from the terminal, the information comprising an IP address of the terminal, a destination telephone number, and a terminal user identification, the destination telephone being connected to the telephone network, the proxy gateway using the IP address of the gateway to bridge the terminal to the telephone network, the proxy gateway comparing the user identification with the terminal user identification before granting call authorization.

13. The method of claim 11, wherein the proxy gateway belongs to a zone of the gatekeeper, the proxy gateway registering with the gatekeeper in order to establish the interface with the gatekeeper.

14. The method of claim 11, wherein the proxy gateway enforces call authorization and user credit policies, authenticates caller identification, monitors duration of calls, maintains caller credit information, provides updated caller credit information to the gatekeeper, and prompts termination of a call when a caller's credit information indicates credit exhausted.

15. The method of claim 11, wherein the proxy gateway facilitates billing.

16. A telephony system comprising:
   a network;
   a terminal connected to the network;
   a gatekeeper connected to the network;
   a gateway connected to the network and a telephone network; and
   a proxy gateway connected to the network, the proxy gateway communicating with the terminal and the gateway via the network, the proxy gateway comprising a gateway portion and a terminal portion, the proxy gateway providing for call setup, call proceeding, and call termination, wherein the proxy gateway behaves as a terminal with respect to the terminal and behaves as a gateway with respect to the gateway;

wherein the proxy gateway registers with a directory service associated with the proxy gateway and the terminal, when a telephone calls a terminal, the proxy gateway prompts the directory service to look up an IP address of the called terminal based on a telephone number of the called terminal received from the gateway, the telephone being connected to the telephone network, the proxy gateway bridging the called terminal to the telephone network via the gateway, and wherein the proxy gateway prompts the called terminal to log onto the network so that a new IP address can be assigned to the called terminal when the directory service cannot find any IP address associated with the called terminal, the directory service provides the new IP address to the proxy gateway.

17. The telephony system of claim 16, wherein the telephony system further comprises:
   additional gatekeepers connected to the network, wherein a zone is associated with each gatekeeper;
   additional terminals connected to the network, each terminal being in one of the gatekeeper zones;
   additional gateways connected to the network, each gateway being in one of the gatekeeper zones; and
   additional proxy gateways connected to the network, each proxy gateway being in one of the gatekeeper zones, each proxy gateway comprising a gateway portion and a terminal portion, wherein each proxy gateway behaves as a terminal with respect to a terminal and behaves as a gateway with respect to a gateway.

* * * * *